United States Patent
Kasamatsu et al.

(10) Patent No.: US 10,148,167 B2
(45) Date of Patent: Dec. 4, 2018

(54) POWER SUPPLY DEVICE AND CONTROL METHOD

(71) Applicant: KONICA MINOLTA, INC., Chiyoda-ku, Tokyo (JP)

(72) Inventors: Toru Kasamatsu, Toyokawa (JP); Mikiyuki Aoki, Toyohashi (JP); Kouei Cho, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/655,986

(22) Filed: Jul. 21, 2017

(65) Prior Publication Data

US 2018/0026524 A1 Jan. 25, 2018

(30) Foreign Application Priority Data

Jul. 25, 2016 (JP) .................................. 2016-145415

(51) Int. Cl.
| | |
|---|---|
| H02M 1/36 | (2007.01) |
| G03G 15/00 | (2006.01) |
| H02M 3/28 | (2006.01) |
| H02M 3/335 | (2006.01) |
| H02M 1/00 | (2006.01) |

(52) U.S. Cl.
CPC .............. *H02M 1/36* (2013.01); *G03G 15/80* (2013.01); *H02M 3/285* (2013.01); *H02M 3/33507* (2013.01); *H02M 2001/0032* (2013.01)

(58) Field of Classification Search
CPC .... H02M 1/36; H02M 3/33507; H02M 3/285; G03G 15/80
See application file for complete search history.

(56) References Cited

U.S. PATENT DOCUMENTS

| | | | | |
|---|---|---|---|---|
| 4,375,663 A | * | 3/1983 | Arcara ...................... | G06F 1/30 365/226 |
| 2013/0148386 A1 | * | 6/2013 | Chen ................. | H02M 3/33523 363/21.12 |
| 2013/0235622 A1 | * | 9/2013 | Masuda ............ | H02M 3/33507 363/21.12 |

(Continued)

FOREIGN PATENT DOCUMENTS

| | | |
|---|---|---|
| JP | H 08-149686 A | 6/1996 |
| JP | 2002-236528 A | 8/2002 |

*Primary Examiner* — G. M. Hyder
(74) *Attorney, Agent, or Firm* — Buchanan Ingersoll & Rooney PC (57) ABSTRACT

A power supply device includes: a first transformer including a primary winding and a secondary winding; a first control circuit controlling a switching operation of a switch element, and cause the primary winding to generate a first AC voltage; an application circuit receiving a second AC voltage generated in the secondary winding by mutual induction with the primary winding, and apply an output voltage according to the second AC voltage to a load; a voltage detection circuit detecting a magnitude of a DC voltage obtained by rectifying the first AC voltage or the second AC voltage; and an output circuit outputting a stop signal indicating stop of the power supply device, when a result of comparison between the magnitude of the DC voltage and a threshold value set according to a magnitude of the load satisfies a predetermined condition, after reception of an instruction to stop voltage supply.

20 Claims, 10 Drawing Sheets

(56) References Cited

U.S. PATENT DOCUMENTS

2014/0016364 A1* 1/2014 Chen ................. H02M 3/33507
                                                363/21.02
2014/0062333 A1* 3/2014 Sonobe ............. H05B 33/0815
                                                315/291

* cited by examiner

POWER SUPPLY DEVICE AND CONTROL METHOD

Japanese Patent Application No. 2016-145415 filed on Jul. 25, 2016, including description, claims, drawings, and abstract the entire disclosure is incorporated herein by reference in its entirety.

BACKGROUND

Technological Field

The present disclosure relates to a technique for controlling timing to output a stop signal indicating stop of voltage supply.

Description of the Related Art

Power supply devices which output a stop signal indicating stop of a power supply before stopping voltage supply have been widely used. The stop signal is output before the power supply device stops completely. Accordingly, an external apparatus which receives the stop signal can perform stop preparation processing (such as backup processing, for example) in preparation for the stop of the power supply, before the power supply device stops completely.

Regarding techniques for performing backup processing based on a stop signal, Japanese Laid-Open Patent Publication No. 08-149686 discloses a power supply device "which detects a power failure of a direct current (DC) power supply for an apparatus, and allows processing of saving data stored in a memory within the apparatus". Japanese Laid-Open Patent Publication No. 2002-236528 discloses a power supply device "capable of saving unprocessed data in a memory when an alternating current (AC) input voltage decreases".

It takes time from when an instruction to stop voltage supply is received to when voltage supply to an external apparatus stops completely. If a stop signal is output frequently during this period, the external apparatus repeatedly performs stop preparation processing such as backup processing and system reset. Further, when a stop signal is output too early, the stop preparation processing is started although there is enough time to perform the stop preparation processing. Therefore, in order to make time given for the stop preparation processing constant, it is desired to appropriately control timing to output a stop signal.

The power supply devices disclosed in Japanese Laid-Open Patent Publication No. 08-149686 and Japanese Laid-Open Patent Publication No. 2002-236528 each output a stop signal when an input voltage is less than a predetermined value. Accordingly, the power supply devices can each delay output of the stop signal, and suppress the number of times the stop signal is output. However, the time taken from when an instruction to stop voltage supply is received to when voltage supply to an external apparatus stops completely varies according to a magnitude of a load connected to the power supply device. Accordingly, in the power supply devices disclosed in Japanese Laid-Open Patent Publication No. 08-149686 and Japanese Laid-Open Patent Publication No. 2002-236528, time taken from when the stop signal is output to when voltage supply stops completely varies according to the magnitude of a load connected to each power supply device. Therefore, the stop signal may be output frequently, and backup processing and system reset processing may be performed repeatedly.

The present disclosure has been made to solve the aforementioned problem, and an object of the present disclosure in an aspect is to provide a power supply device capable of making time taken from when a stop signal is output to when voltage supply stops constant. An object of the present disclosure in another aspect is to provide a control method capable of making time taken from when a stop signal is output to when voltage supply stops constant.

SUMMARY

To achieve at least one of the abovementioned objects, a power supply device reflecting one aspect of the present invention comprises: a first transformer including a primary winding and a secondary winding; a first control circuit for controlling a switching operation of a switch element electrically connected with the primary winding, and causing the primary winding to generate a first AC voltage; an application circuit for receiving a second AC voltage generated in the secondary winding by mutual induction with the primary winding to which the first AC voltage is applied, and applying an output voltage according to the second AC voltage to a load connected to the power supply device; a voltage detection circuit for detecting a magnitude of a DC voltage obtained by rectifying the first AC voltage or the second AC voltage; and an output circuit for outputting a stop signal indicating stop of the power supply device, when a result of comparison between the magnitude of the DC voltage and a threshold value set according to a magnitude of the load satisfies a predetermined condition, after reception of an instruction to stop voltage supply.

The output circuit outputs the stop signal when the DC voltage obtained by rectifying the second AC voltage is more than the threshold value.

The output circuit outputs the stop signal when the DC voltage obtained by rectifying the first AC voltage is less than the threshold value.

The power supply device further comprises a setting circuit for setting the threshold value. The setting circuit may detect a current flowing into the load, and increase the threshold value with an increase in the current.

The second AC voltage is a PWM (Pulse Width Modulation) signal. The setting circuit may detect a magnitude of the current flowing into the load, based on a duty ratio of the PWM signal.

The power supply device may have a first output mode, and a second output mode in which a voltage to be output to the load is less than that in the first output mode. The threshold value in the second output mode may be lower than the threshold value in the first output mode.

The threshold value may be set from among a plurality of predetermined different threshold values, according to the magnitude of the load.

The output circuit may output the stop signal after a predetermined time elapses after reception of an instruction to start voltage supply.

The power supply device further comprises a second transformer, and a second control circuit for controlling a voltage to be applied to the second transformer. The second control circuit may stop application of the voltage to the second transformer based on reception of the stop signal from the output circuit.

The first transformer outputs a voltage having a magnitude different from that of the second transformer.

The output circuit may output the stop signal to an external apparatus and thereby cause the external apparatus to perform backup processing.

The threshold value may be set based on a connection status of the load to an external apparatus.

The first control circuit may control the first transformer using a flyback scheme.

According to an aspect of the present invention, an image forming apparatus comprises the power supply device described above.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments. Since their names and functions are also the same, the detailed description thereof will not be repeated. It should be noted that the embodiments and variations described below may be selectively combined as appropriate.

[Internal Structure of Image Forming Apparatus 100]

Figure 1:
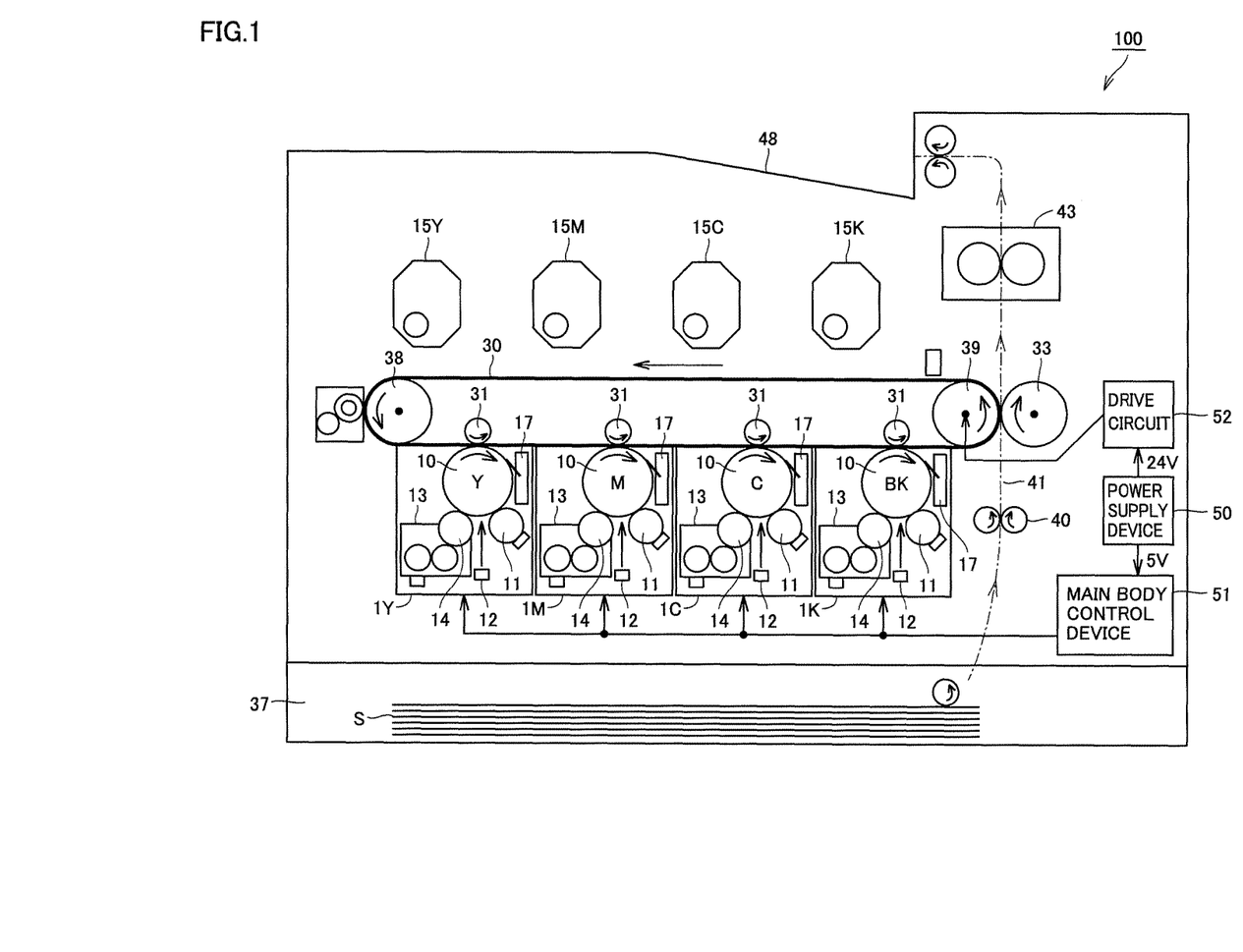
FIG. 1 is a view showing an example of an internal structure of an image forming apparatus in accordance with an embodiment.

Referring to FIG. 1, an image forming apparatus 100 equipped with a power supply device 50 will be described. FIG. 1 is a view showing an example of an internal structure of image forming apparatus 100.

FIG. 1 shows image forming apparatus 100 serving as a color printer. Although image forming apparatus 100 serving as a color printer will be described below, image forming apparatus 100 is not limited to a color printer. For example, image forming apparatus 100 may be a monochrome printer, a facsimile, or a multi-functional peripheral (MFT) having functions of a monochrome printer, a color printer, and a facsimile.

Image forming apparatus 100 includes image forming units 1Y, 1M, 1C, 1K, an intermediate transfer belt 30, primary transfer rollers 31, a secondary transfer roller 33, a cassette 37, a driven roller 38, a drive roller 39, timing rollers 40, a fixing device 43, power supply device 50, a main body control device 51, and a drive circuit 52.

Image forming units 1Y, 1M, 1C, 1K are arranged in order along intermediate transfer belt 30. Image forming unit 1Y receives supply of toner from a toner bottle 15Y and forms a toner image in yellow (Y). Image forming unit 1M receives supply of toner from a toner bottle 15M and forms a toner image in magenta (M). Image forming unit 1C receives supply of toner from a toner bottle 15C and forms a toner image in cyan (C). Image forming unit 1K receives supply of toner from a toner bottle 15K and forms a toner image in black (BK).

Image forming units 1Y, 1M, 1C, 1K are respectively arranged in order along intermediate transfer belt 30. Image forming units 1Y, 1M, 1C, 1K each include a photoconductor 10, a charging device 11, an exposure device 12, a developing device 13, and a cleaning device 17.

Charging device 11 uniformly charges the surface of photoconductor 10. Exposure device 12 emits a laser beam to photoconductor 10 according to a control signal from main body control device 51, and performs exposure on the surface of photoconductor 10 according to an input image pattern. Thereby, an electrostatic latent image according to an input image is formed on photoconductor 10.

Developing device 13 applies a developing bias to a developing roller 14 while rotating developing roller 14, to cause toner to adhere to the surface of developing roller 14. Thereby, the toner is transferred from developing roller 14 to photoconductor 10, and a toner image according to the electrostatic latent image is developed on the surface of photoconductor 10.

Photoconductor 10 and intermediate transfer belt 30 are in contact with each other at a portion provided with primary transfer roller 31. Primary transfer roller 31 is rotatably configured. By applying a transfer voltage having a polarity opposite to that of the toner image to primary transfer roller 31, the toner image is transferred from photoconductor 10 to intermediate transfer belt 30. The toner image in yellow (Y), the toner image in magenta (M), the toner image in cyan (C), and the toner image in black (BK) are transferred from photoconductor 10 to intermediate transfer belt 30, with being overlaid in order. Thereby, a color toner image is formed on intermediate transfer belt 30.

Intermediate transfer belt 30 stretches between driven roller 38 and drive roller 39. Drive roller 39 is rotatably driven by a motor (not shown), for example. The rotation speed and the rotation direction of the motor are controlled by drive circuit 52. Intermediate transfer belt 30 and driven roller 38 rotate in conjunction with drive roller 39. Thereby, the toner image on intermediate transfer belt 30 is transported to secondary transfer roller 33.

Cleaning device 17 is in pressure contact with photoconductor 10. Cleaning device 17 collects toner remaining on the surface of photoconductor 10 after the toner image is transferred therefrom.

Sheets S are set in cassette 37. Sheets S are transported one by one by timing rollers 40, from cassette 37 to secondary transfer roller 33, along a transportation path 41. Secondary transfer roller 33 applies a transfer voltage having a polarity opposite to that of the toner image to sheet S while it is transported. Thereby, the toner image is attracted from intermediate transfer belt 30 to secondary transfer roller 33, and the toner image on intermediate transfer belt 30 is transferred. Timing to transport sheet S to secondary transfer roller 33 is adjusted by timing rollers 40 according to the position of the toner image on intermediate transfer belt 30. The toner image on intermediate transfer belt 30 is transferred onto an appropriate position in sheet S by timing rollers 40.

Fixing device 43 applies pressure and heat to sheet S passing therethrough. Thereby, the toner image formed on sheet S is fixed on sheet S. Thereafter, sheet S is ejected onto a tray 48.

Power supply device 50 supplies voltage to each device within image forming apparatus 100, for example. As an example, power supply device 50 supplies a voltage of 5 V to main body control device 51 which controls image forming apparatus 100, and supplies a voltage of 24 V to drive circuit 52 which controls drive roller 39. Details of power supply device 50 will be described later.

[Main Configuration of Power Supply Device 50]

Figure 2:
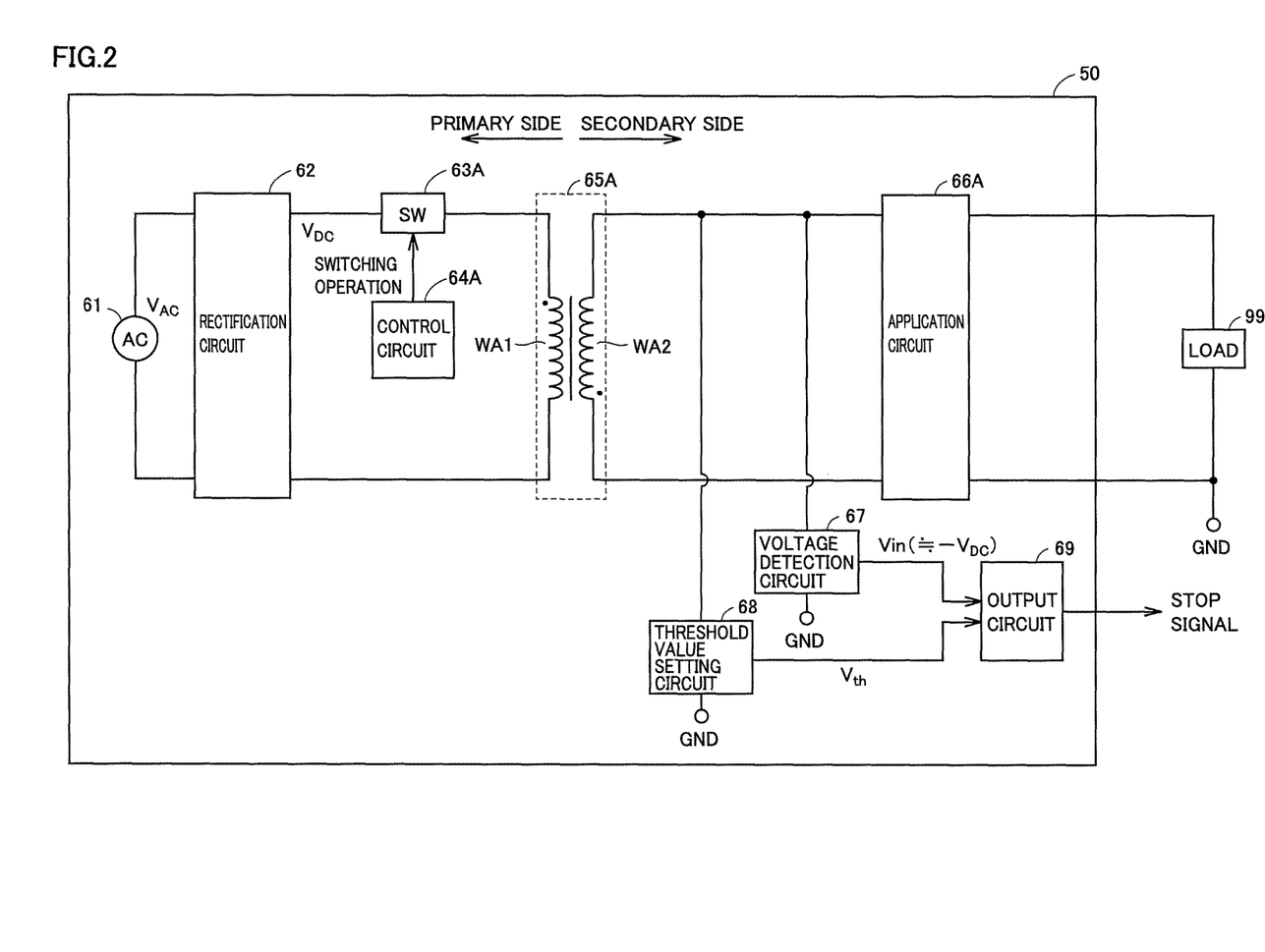
FIG. 2 is a view showing a main configuration of a power supply device in accordance with the embodiment.
Figure 3:
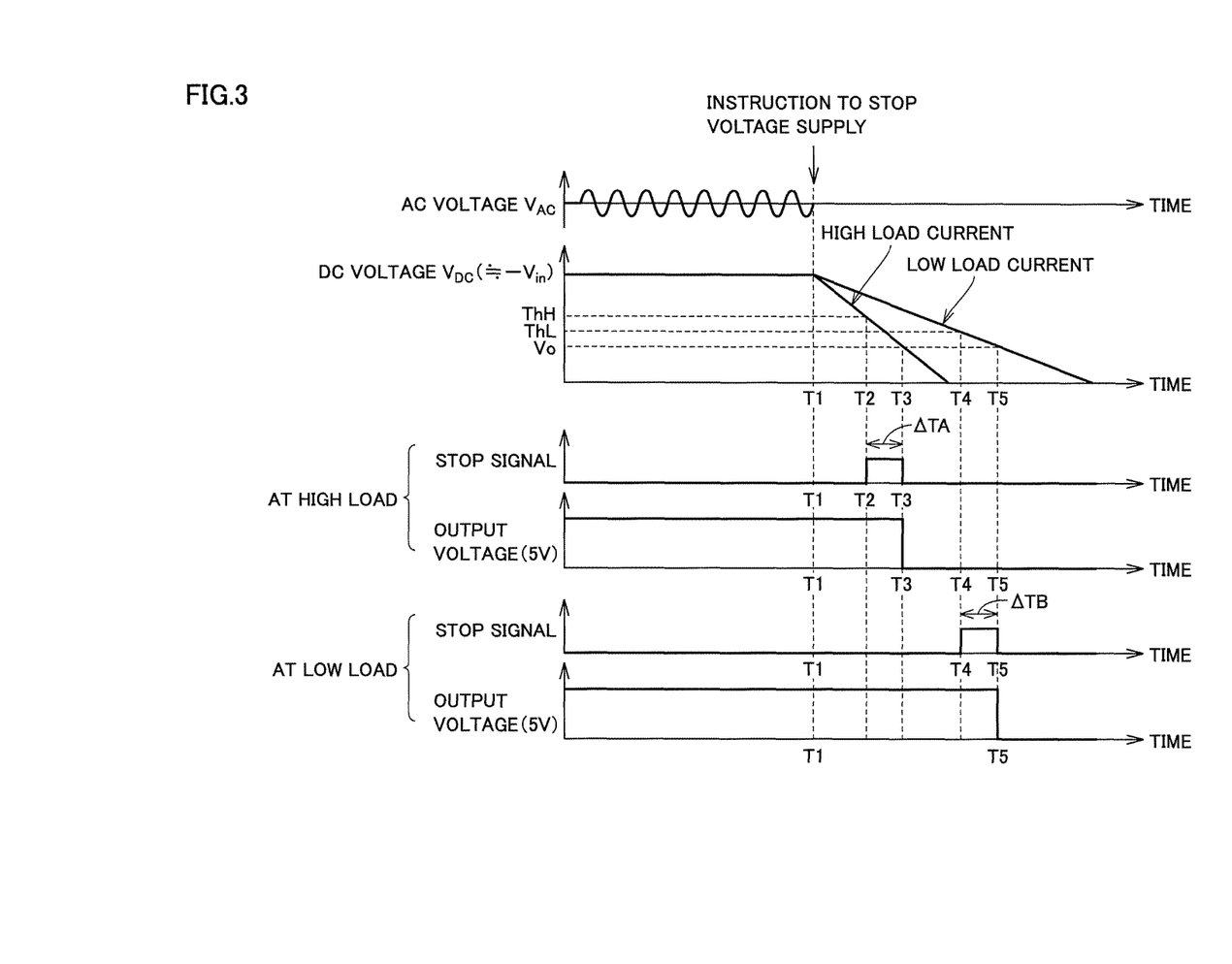
FIG. 3 is a view showing a manner of change of time taken until voltage supply of the power supply device in accordance with the embodiment stops, according to a magnitude of a load.

Referring to FIGS. 2 and 3, power supply device 50 described above will be described. FIG. 2 is a view showing a main configuration of power supply device 50. FIG. 3 is a view showing a manner of change of time taken until voltage supply of power supply device 50 stops, according to a magnitude of a load.

FIG. 2 shows power supply device 50 serving as a DC-DC (Direct Current-Direct Current) converter. As shown in FIG. 2, power supply device 50 includes an AC power supply 61, a rectification circuit 62, a switch element 63A, a control circuit 64A, a transformer 65A, an application circuit 66A, a voltage detection circuit 67, a threshold value setting circuit 68, and an output circuit 69.

AC power supply 61 outputs an AC voltage $V_{AC}$ having a predetermined frequency to rectification circuit 62. Rectification circuit 62 converts AC voltage $V_{AC}$ into a DC voltage $V_{DC}$, and outputs DC voltage $V_{DC}$ to switch element 63A. Switch element 63A is a transistor, for example. Control circuit 64A (a first control circuit) controls a switching operation of switch element 63A electrically connected with transformer 65A.

Transformer 65A includes a primary winding WA1 and a secondary winding WA2. Primary winding WA1 and secondary winding WA2 are coils, for example. Control circuit 64A controls switching on/off of switch element 63A, and thereby an AC voltage is generated in primary winding WA1. Since primary winding WA1 and secondary winding WA2 are electromagnetically coupled with each other, an AC voltage (induced electromotive force) is generated in secondary winding WA2 by mutual induction with primary winding WA1. The magnitude of the AC voltage generated in secondary winding WA2 is proportional to the number of turns of secondary winding WA2 with respect to the number of turns of primary winding WA1. Typically, the number of turns of secondary winding WA2 is greater than the number of turns of primary winding WA1. As a result, DC voltage $V_{DC}$ is boosted by transformer 65A.

Application circuit 66A applies an output voltage according to the AC voltage generated in secondary winding WA2 to a load 99 connected to power supply device 50. Typically, application circuit 66A serves as a rectification circuit, and rectifies the AC voltage generated in secondary winding WA2 and applies the output voltage to load 99. Thereby, a DC voltage is applied to load 99. Load 99 is, for example, any device within image forming apparatus 100. As an example, load 99 may be drive circuit 52 described above (see FIG. 1), or may be main body control device 51 described above (see FIG. 1).

It takes time from when power supply device 50 receives an instruction to stop voltage supply to when voltage supply to load 99 stops. The time changes according to the magnitude of load 99. FIG. 3 shows the manner of change.

As shown in FIG. 3, it is assumed that power supply device 50 receives an instruction to stop voltage supply, at a time point T1. Thereby, AC power supply 61 stops output of AC voltage $V_{AC}$. In this case, as load 99 has a higher load, time taken until DC voltage $V_{DC}$ decreases to less than or equal to a predetermined voltage $V_0$ becomes shorter. Voltage $V_0$ indicates a minimum voltage required for each component within power supply device 50 to operate. As an example, when load 99 has a high load, DC voltage $V_{DC}$ decreases to less than or equal to voltage $V_0$ at a time point T3. When load 99 has a low load, DC voltage $V_{DC}$ decreases to less than or equal to voltage $V_0$ at a time point T5.

In this manner, the time taken from when power supply device 50 receives an instruction to stop voltage supply to when voltage supply to load 99 stops changes according to the magnitude of load 99. If a stop signal is output frequently during this period, an external apparatus including load 99 repeatedly performs stop preparation processing such as backup processing and system reset. In particular, when power supply device 50 is configured to output a stop signal for every cycle of the AC voltage generated in secondary winding WA2, the stop signal is output frequently. Accordingly, power supply device 50 in accordance with the present embodiment delays timing to output the stop signal as the load decreases, in order to make time given for the stop preparation processing constant irrespective of the magnitude of load 99.

Processing of controlling the timing to output the stop signal will be described with reference back to FIG. 2. Voltage detection circuit 67 rectifies the AC voltage (a second AC voltage) generated in secondary winding WA2 by mutual induction with primary winding WA1, and detects a magnitude of a DC voltage $V_{in}$ obtained by the rectification. Since the magnitude of DC voltage $V_{in}$ correlates with a magnitude of DC voltage $V_{DC}$, detection of DC voltage $V_{in}$ indirectly detects the magnitude of DC voltage $V_{DC}$. Accordingly, voltage detection circuit 67 may be configured to detect the magnitude of DC voltage $V_{DC}$ obtained by rectifying AC voltage $V_{AC}$, instead of DC voltage $V_{in}$. In the example of FIG. 2, since secondary winding WA2 is wound in a direction different from that of primary winding WA1, the sign of DC voltage $V_{in}$ is opposite to the sign of DC voltage $V_{DC}$. DC voltage $V_{in}$ detected by voltage detection circuit 67 is output to output circuit 69.

Threshold value setting circuit 68 sets a threshold value $V_{th}$ serving as a reference for outputting a stop signal, according to the magnitude of load 99. More specifically, threshold value setting circuit 68 detects a current flowing into load 99 (hereinafter also referred to as a "load current") as the magnitude of load 99, and sets threshold value $V_{th}$ according to a magnitude of the load current. Since the magnitude of the load current correlates with the magnitude of load 99, detection of the load current indirectly detects the magnitude of load 99.

Output circuit 69 outputs a stop signal indicating stop of power supply device 50, when a result of comparison between DC voltage $V_{DC}$ or DC voltage $V_{in}$ and threshold value $V_{th}$ set according to the magnitude of load 99 satisfies a predetermined condition, after reception of an instruction to stop voltage supply. In an aspect, the predetermined condition is satisfied when the magnitude of DC voltage $V_{DC}$ is less than threshold value $V_{th}$. In another aspect, the predetermined condition is satisfied when the magnitude of DC voltage $V_{in}$ is more than threshold value $V_{th}$. In this manner, since the sign of DC voltage $V_{in}$ is opposite to the sign of DC voltage $V_{DC}$, the expression that DC voltage $V_{in}$ is more than threshold value $V_{th}$ is synonymous with the expression that DC voltage $V_{DC}$ is less than threshold value $V_{th}$ having an opposite sign. In the following, a description will be given of an example in which a stop signal is output based on comparison between DC voltage $V_{DC}$ and threshold value $V_{th}$.

As shown in FIG. 3, when load 99 has a high load, a threshold value ThH is set as threshold value $V_{th}$. In this case, output circuit 69 outputs a stop signal on the basis that the magnitude of DC voltage $V_{DC}$ becomes smaller than threshold value ThH. As a result, the stop signal is output at a time point T2, and the external apparatus can perform the stop preparation processing (such as backup processing, for example) during a time ΔTA from time point T2 to time point T3.

On the other hand, when load 99 has a low load, a threshold value ThL, is set as threshold value $V_{th}$. In this case, output circuit 69 outputs a stop signal on the basis that the magnitude of DC voltage $V_{DC}$ becomes smaller than threshold value ThL. As a result, the stop signal is output at a time point T4, and the external apparatus can perform the stop preparation processing (such as backup processing, for example) during a time ΔTB from time point T4 to time point T5. In this manner, times ΔTA and ΔTB taken from when the stop signal is output to when voltage supply stops become constant irrespective of the magnitude of the load connected to power supply device 50.

It should be noted that the above description has been given on the premise that threshold value $V_{th}$ is compared with DC voltage $V_{DC}$. Based on this premise, threshold value setting circuit 68 increases threshold value $V_{th}$ with an increase in the load current. When threshold value $V_{th}$ is compared with DC voltage $V_{in}$, threshold value setting circuit 68 decreases threshold value $V_{th}$ with an increase in the load current.

Further, although the example of FIG. 3 has described a case where threshold value $V_{th}$ is set to one of two threshold values ThL and ThH, threshold value $V_{th}$ may be set to one of three or more threshold values. In this case, threshold value $V_{th}$ is set from among a plurality of different threshold values divided in a stepwise manner, according to the magnitude of load 99. The plurality of different threshold values are set beforehand by a user or a designer. Furthermore, threshold value $V_{th}$ does not necessarily need to be set from among the plurality of threshold values divided in a stepwise manner, and may be set in line with the magnitude of the load 99. As an example, threshold value setting circuit 68 may set threshold value $V_{th}$ in proportion to the magnitude of load 99.

Moreover, since the load increases as more external instruments are connected to image forming apparatus 100, threshold value $V_{th}$ may be set according to a connection status of an external instrument connected to image forming apparatus 100. In this case, threshold value $V_{th}$ is defined beforehand for each combination of external instruments that can be connected to image forming apparatus 100. Power supply device 50 obtains information of external instruments connected to image forming apparatus 100 from image forming apparatus 100, and sets threshold value $V_{th}$ associated with the combination of the external instruments.

[Circuit Example 1 of Power Supply Device 50]

Figure 4:
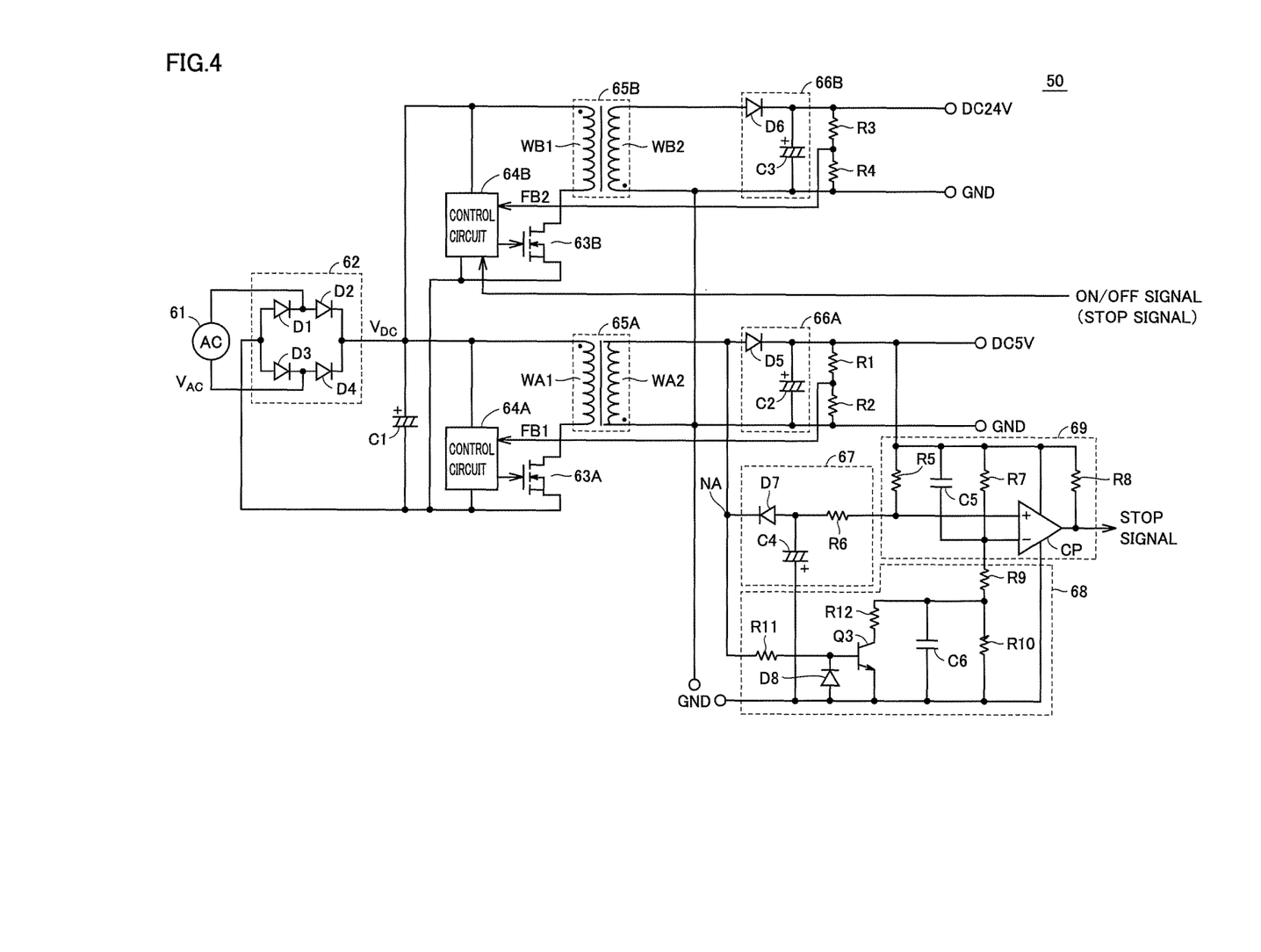
FIG. 4 is a view showing a circuit example 1 of the power supply device in accordance with the embodiment.

Referring to FIG. 4, a circuit configuration of power supply device 50 will be described. FIG. 4 is a view showing a circuit example 1 of power supply device 50. FIG. 4 shows power supply device 50 capable of outputting a plurality of voltages having different magnitudes (5 V, 24 V).

Power supply device 50 includes AC power supply 61 which outputs AC voltage $V_{AC}$ having a predetermined frequency. AC power supply 61 is connected to rectification circuit 62. Rectification circuit 62 includes diodes D1 to D4. AC voltage $V_{AC}$ is rectified by diodes D1 to D4, smoothed by a capacitor C1, and then output as DC voltage $V_{DC}$ to transformers 65A, 65B.

Transformer 65A includes primary winding WA1 and secondary winding WA2. Transformer 65B includes a primary winding WB1 and a secondary winding WB2. The ratio between the number of turns of primary winding WA1 and the number of turns of secondary winding WA2 is different from the ratio between the number of turns of primary winding WB1 and the number of turns of secondary winding WB2. Thereby, transformer 65A (a first transformer) outputs a voltage having a magnitude different from that of transformer 65B (a second transformer). As an example, transformer 65A is configured to output a voltage of 5 V, and transformer 65B is configured to output a voltage of 24 V.

Power supply device 50 includes control circuit 64A. Control circuit 64A (the first control circuit) controls a switching operation of switch element 63A electrically connected with transformer 65A. Control circuit 64A controls switching on/off of switch element 63A, and thereby an AC voltage is generated in primary winding WA1, and an AC voltage (induced electromotive force) is generated in secondary winding WA2 by mutual induction with primary winding WA1. More specifically, control circuit 64A controls switch element 63A by PWM (Pulse Width Modulation) control, and a PWM signal is generated as an AC voltage in each of primary winding WA1 and secondary winding WA2. By controlling ON time of switch element 63A per unit time, a duty ratio of the PWM signal generated in each of primary winding WA1 and secondary winding WA2 is controlled.

Preferably, control circuit 64A (the first control circuit) controls transformer 65A (the first transformer) using a flyback scheme. The flyback scheme is a scheme by which electric power is stored in transformer 65A while switch element 63A is ON, and then switch element 63A is switched off to output the electric power stored in transformer 65A using a counter electromotive force of transformer 65A. It should be noted that control circuit 64A may control transformer 65A using a forward scheme.

Power supply device 50 includes a control circuit 64B. Control circuit 64B (a second control circuit) controls a switching operation of a switch element 63B electrically connected with transformer 65B. Control circuit 64B controls switching on/off of switch element 63B, and thereby an AC voltage is generated in primary winding WB1, and an AC voltage (induced electromotive force) is generated in secondary winding WB2 by mutual induction with primary winding WB1. That is, control circuit 64B controls switch element 63B by PWM control, and a PWM signal is generated as an AC voltage in each of primary winding WB1 and secondary winding WB2. By controlling ON time of switch element 63B per unit time, a duty ratio of the PWM signal generated in each of primary winding WB1 and secondary winding WB2 is controlled. As with control circuit 64A, control circuit 64B controls transformer 65B using a flyback scheme. Alternatively, control circuit 64B may control transformer 65B using a forward scheme.

Application circuit 66A is connected to secondary winding WA2. Application circuit 66A includes a capacitor C2 and a diode D5. Application circuit 66A rectifies the AC voltage generated in secondary winding WA2 by diode D5, and smoothes the rectified voltage by capacitor C2. As a result, the AC voltage is converted into a DC voltage. The DC voltage is applied to a load (for example, main body control device 51 described above (see FIG. 1)) connected to power supply device 50.

The DC voltage output from application circuit 66A is divided by resistors R1, R2, and fed back to control circuit 64A as a signal FB1. Control circuit 64A controls the switching operation of switch element 63A such that fed back signal FB1 has a predetermined voltage value. As a result, application circuit 66A can apply a constant voltage (for example, 5 V) to the load irrespective of the magnitude of the connected load.

An application circuit 66B is connected to secondary winding WB2. Application circuit 66B includes a capacitor C3 and a diode D6. Application circuit 66B rectifies the AC voltage generated in secondary winding WB2 by diode D6, and smoothes the rectified voltage by capacitor C3. As a result, the AC voltage is converted into a DC voltage. The DC voltage is applied to a load (for example, drive circuit 52 (see FIG. 1)) connected to power supply device 50.

The DC voltage output from application circuit 66B is divided by resistors R3, R4, and fed back to control circuit 64B as a signal FB2. Control circuit 64B controls the switching operation of switch element 63B such that fed back signal FB2 has a predetermined voltage value. As a result, application circuit 66B can apply a constant voltage (for example, 24 V) to the load irrespective of the magnitude of the connected load.

Voltage detection circuit 67 described above (see FIG. 2) and threshold value setting circuit 68 described above (see FIG. 2) are connected to secondary winding WA2. Output circuit 69 described above (see FIG. 2) is connected to voltage detection circuit 67 and threshold value setting circuit 68. Voltage detection circuit 67 includes a capacitor C4, a resistor R6, and a diode D7. Threshold value setting circuit 68 includes a switch element Q3 as a transistor, a capacitor C6, a diode D8, and resistors R9 to R12. Output circuit 69 includes a comparator CP, resistors R5 to R8, and a capacitor C5.

Figure 5:
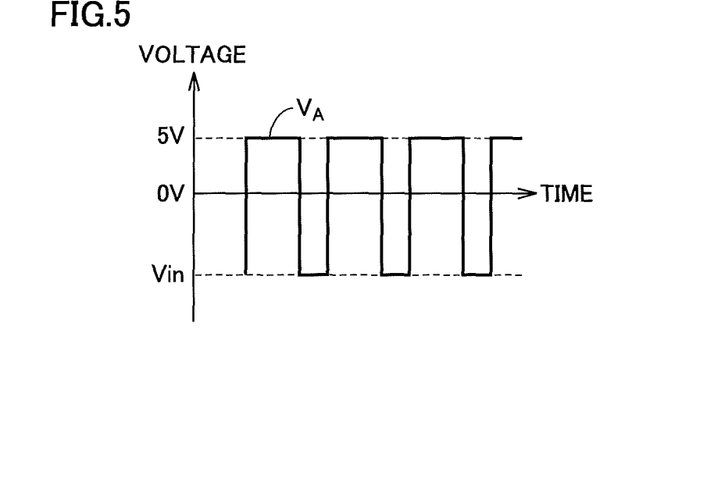
FIG. 5 is a view showing a waveform of an AC voltage at a node NA shown in FIG. 4.

Referring to FIG. 5, operations of voltage detection circuit 67, threshold value setting circuit 68, and output circuit 69 will be described. FIG. 5 is a view showing a waveform of an AC voltage $V_A$ at a node NA shown in FIG. 4. AC voltage $V_A$ at node NA is equal to the AC voltage generated in secondary winding WA2.

As described above, the output voltage to the load is maintained at 5 V by control circuit 64A. Since the maximum value of AC voltage $V_A$ is maintained at 5 V, if the voltage of AC power supply 61 varies, voltage $V_{in}$, which is the minimum value of AC voltage $V_A$, varies. That is, voltage $V_{in}$ correlates with the minimum voltage of AC voltage $V_{AC}$ output from AC power supply 61. Therefore, detecting voltage $V_{in}$ means detecting the minimum voltage of AC voltage $V_{AC}$. Voltage detection circuit 67 detects the minimum voltage of AC voltage $V_{AC}$ by detecting voltage $V_{in}$, which is the minimum value of AC voltage $V_A$. More specifically, AC voltage $V_A$ at node NA is rectified by diode D7, and smoothed by capacitor C4. As a result, capacitor C4 holds voltage $V_{in}$ of AC voltage $V_A$. Voltage $V_{in}$ is output to an input terminal (positive side) of comparator CP connected to capacitor C4 via resistor R6.

Further, in order to apply a constant voltage (5 V) to the load, control circuit 64A increases the ON time of switch element 63A per unit time, as the load connected to power supply device 50 has a higher load. That is, a duty ratio of AC voltage $V_A$ is in line with the magnitude of the load. Therefore, detecting the duty ratio of AC voltage $V_A$ means detecting the magnitude of the load. Considering this point, threshold value setting circuit 68 detects the magnitude of the load based on the duty ratio of AC voltage $V_A$ as a PWM signal. This is synonymous with detecting a load current.

More specifically, when the duty ratio of AC voltage $V_A$ is increased, ON time of switch element Q3 is increased, and a voltage to be output to an input terminal (negative side) of comparator CP has a higher level. That is, threshold value $V_{th}$ serving as the reference for outputting a stop signal is increased. In this manner, threshold value $V_{th}$ is in line with the duty ratio of AC voltage $V_A$.

Figure 6:
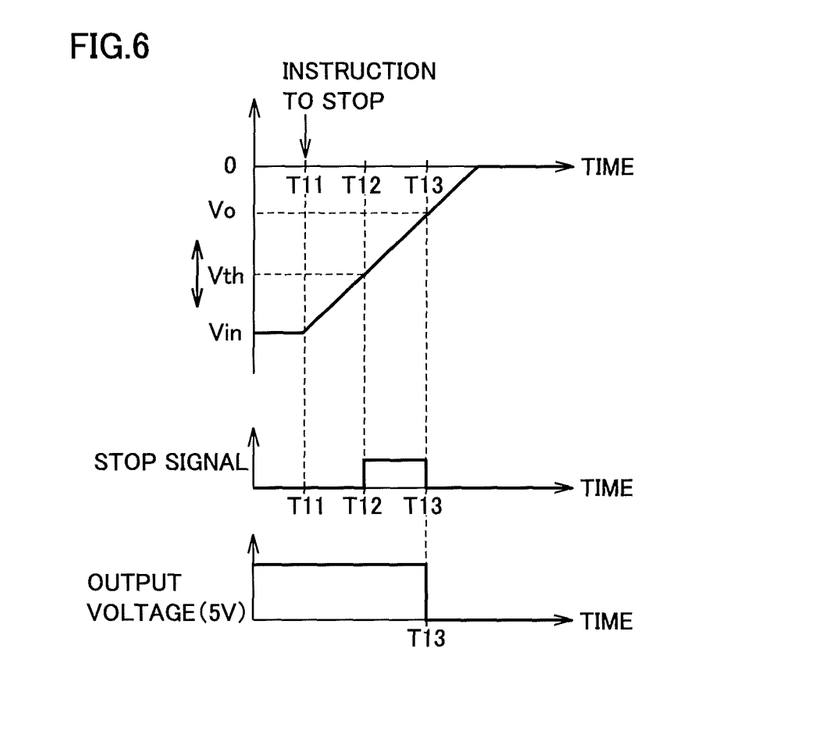
FIG. 6 is a view showing a manner that a stop signal is output according to a result of comparison between a voltage input to an input terminal (positive side) of a comparator and a threshold value input to an input terminal (negative side) of the comparator.

FIG. 6 is a view showing a manner that a stop signal is output according to a result of comparison between voltage $V_{in}$ input to the input terminal (positive side) of comparator CP and threshold value $V_{th}$ input to the input terminal (negative side) of comparator CP.

When the result of comparison between DC voltage $V_{in}$ obtained by rectifying the AC voltage generated in secondary winding WA2 and threshold value $V_{th}$ set according to the magnitude of load 99 satisfies a predetermined condition, comparator CP outputs a stop signal indicating stop of power supply device 50. In the example of FIG. 6, the predetermined condition is satisfied when DC voltage $V_{in}$ exceeds threshold value $V_{th}$. More specifically, it is assumed that power supply device 50 receives an instruction to stop voltage supply, at a time point T11. Thereby, DC voltage $V_{in}$ approaches zero, and DC voltage $V_{in}$ exceeds threshold value $V_{th}$ at a time point T12. Thereby, comparator CP outputs the stop signal to an external apparatus. As a result, the external apparatus performs stop preparation processing (such as backup processing, for example) during a time from time point T12 to a time point T13.

It should be noted that the stop signal may be output to an external apparatus such as image forming apparatus 100 (see FIG. 1), or to an internal device of power supply device 50. As an example, the stop signal is output to control circuit 64B. Control circuit 64B (the second control circuit) stops application of the voltage to transformer 65B (the second transformer) based on reception of the stop signal from output circuit 69.

[Circuit Example 2 of Power Supply Device 50]

Figure 7:
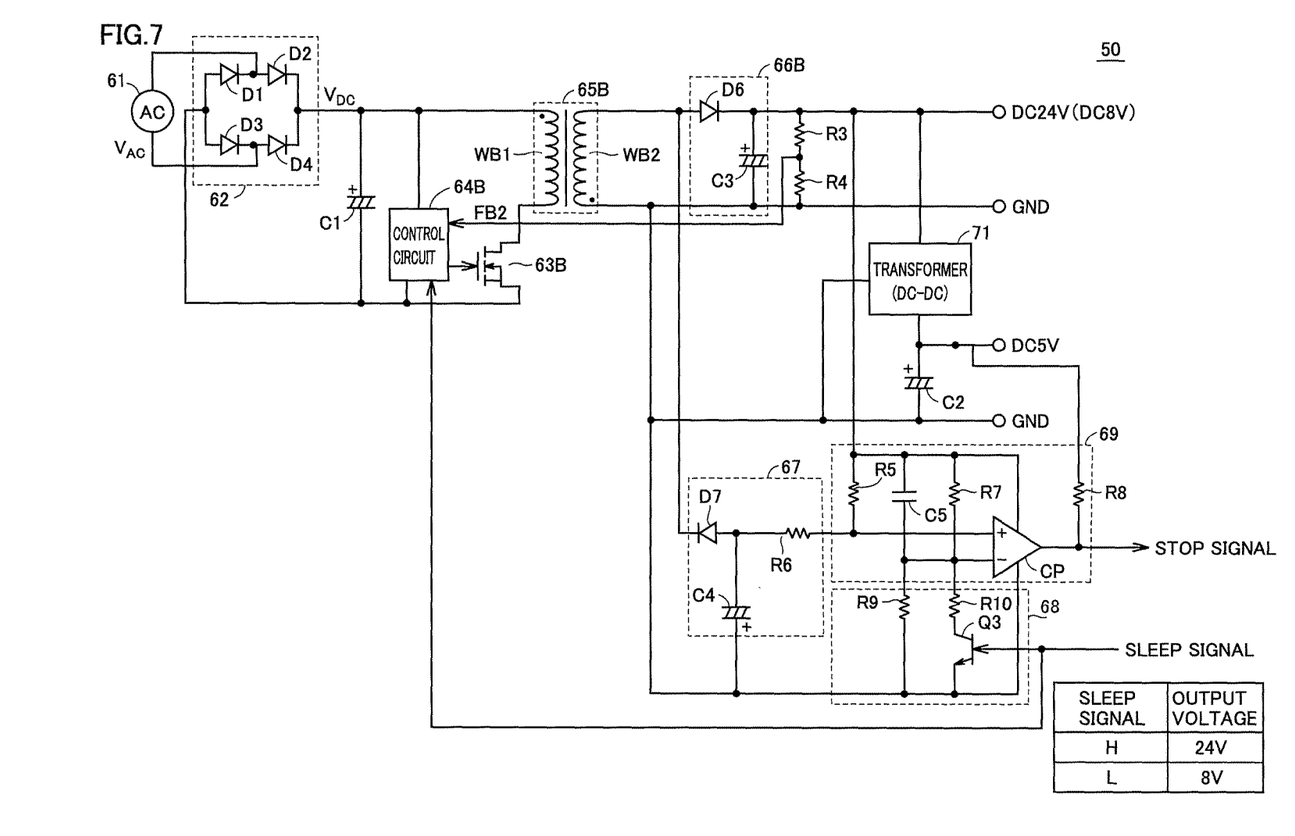
FIG. 7 is a view showing a circuit example 2 of the power supply device in accordance with the embodiment.

Referring to FIG. 7, a circuit example 2 of power supply device 50 will be described. FIG. 7 is a view showing circuit example 2 of power supply device 50.

Although power supply device 50 in accordance with circuit example 1 described above outputs voltages having different magnitudes from respective transformers 65A and 65B, power supply device 50 in accordance with circuit example 2 generates voltages having different magnitudes based on a voltage output from one transformer 65B. Further, in circuit example 2, the circuit configuration of threshold value setting circuit 68 is different from that in circuit example 1. Since other circuit configurations in circuit example 2 are the same as those in circuit example 1, the description thereof will not be repeated below.

As shown in FIG. 7, an AC voltage generated in secondary winding WB2 of transformer 65B is rectified by application circuit 66B, and output to a transformer 71. Transformer 71 is a DC-DC converter, and transforms a DC voltage output from application circuit 66B into a DC voltage having a different magnitude. As an example, the DC voltage output from application circuit 66B is 24 V, and the DC voltage of 24 V is transformed into a DC voltage of 5 V by transformer 71. The DC voltage of 24 V output from application circuit 66B is output to, for example, drive circuit 52 described above (see FIG. 1), and the DC voltage of 5 V output from transformer 71 is output to main body control device 51 described above (see FIG. 1).

As output modes of outputting a voltage to a load, power supply device 50 in the present example includes a normal mode (a first output mode), and a sleep mode (a second output mode) in which an output voltage is lower than that in the normal mode. The output modes are switched according to an operation mode of an external apparatus such as image forming apparatus 100. More specifically, image forming apparatus 100 outputs a sleep signal indicating an operation mode to power supply device 50. The sleep signal is set to High (=H) when image forming apparatus 100 is in an energy saving mode, and set to Low (=L) when image forming apparatus 100 is in operation. When the sleep signal is High, control circuit 64B controls switching on/off of switch element 63B such that the output voltage is set to 24 V. On the other hand, when the sleep signal is Low, control circuit 64B controls switching on/off of switch element 63B such that the output voltage is set to 8 V.

When image forming apparatus 100 is in the energy saving mode, power consumption of image forming apparatus 100 decreases. That is, the load decreases. As described above, when the load decreases, the time taken from when an instruction to stop voltage supply is received to when voltage supply to the external apparatus stops increases. Considering this point, threshold value setting circuit 68 sets threshold value $V_{th}$ (see FIG. 2) in the sleep mode (the second output mode) to be lower than threshold value $V_{th}$ in the normal mode (the first output mode). Thereby, the timing to output the stop signal is delayed, and the time given for the stop preparation processing such as backup processing becomes constant irrespective of the magnitude of the load.

More specifically, threshold value setting circuit 68 includes resistors R9, R10 and switch element Q3 as a transistor. The sleep signal is output to switch element Q3. Switching on/off of switch element Q3 is performed according to input of the sleep signal. As a result, the magnitude of the threshold value input to an input terminal (negative side) of comparator CP changes according to the operation mode of image forming apparatus 100.

Output circuit 69 outputs the stop signal when DC voltage $V_{DC}$ on a primary side (see FIG. 2) is less than threshold value $V_{th}$ set according to the operation mode of image forming apparatus 100. Preferably, output circuit 69 does not output the stop signal until a predetermined time elapses after reception of an instruction to start voltage supply. This prevents the stop signal from being erroneously output, such as immediately after image forming apparatus 100 is started.

[Circuit Example 3 of Power Supply Device 50]

Figure 8:
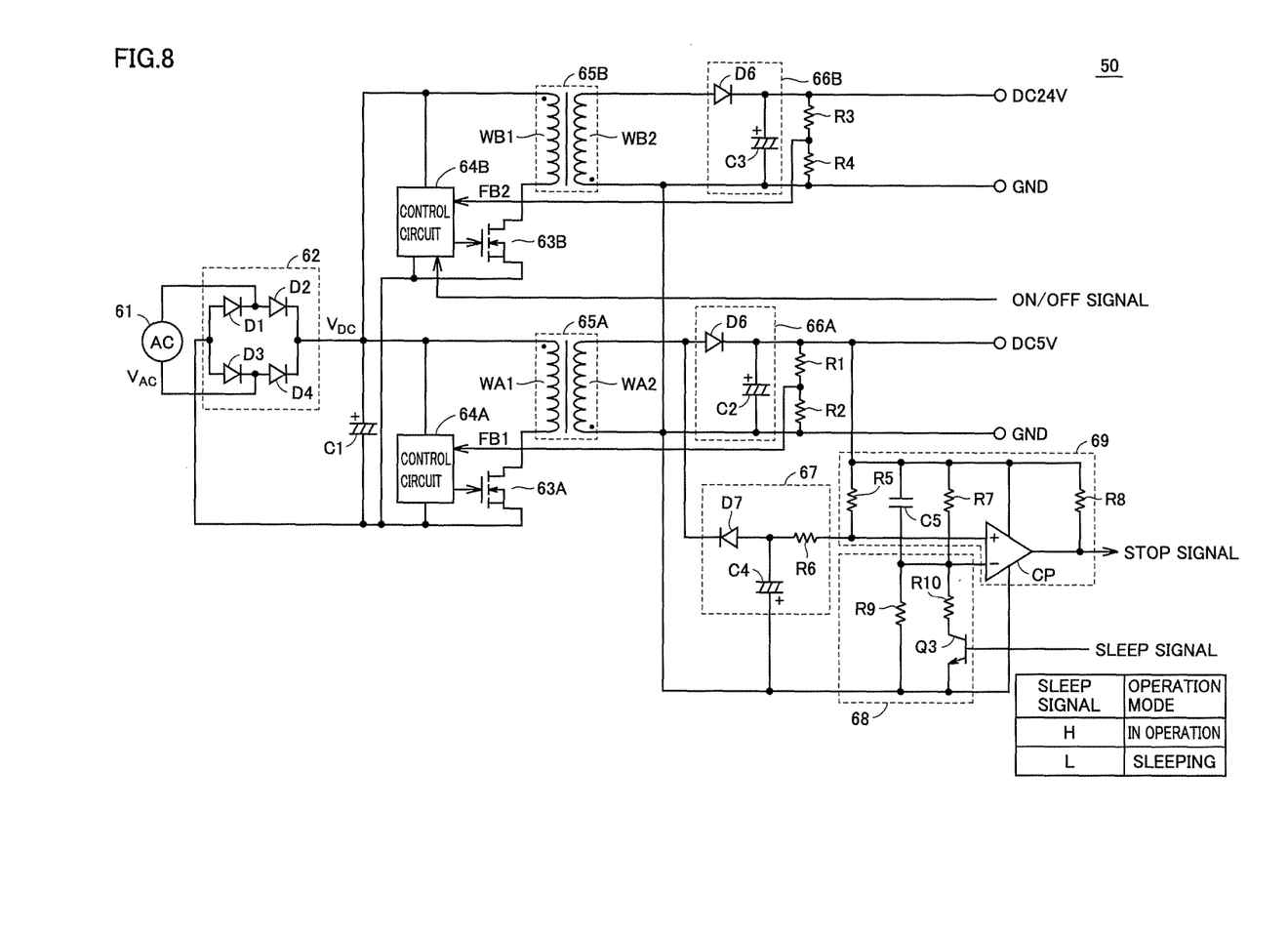
FIG. 8 is a view showing a circuit example 3 of the power supply device in accordance with the embodiment.

Referring to FIG. 8, a circuit example 3 of power supply device 50 will be described. FIG. 8 is a view showing circuit example 3 of power supply device 50.

Circuit example 3 is an example in which circuit example 1 and circuit example 2 described above are combined. More specifically, power supply device 50 in accordance with circuit example 3 is a combination of the feature that power supply device 50 includes two transformers 65A, 65B (circuit example 1) and the feature that the timing to output the stop signal is changed according to the operation mode of image forming apparatus 100 (circuit example 2). Other features of power supply device 50 in accordance with circuit example 3 are the same as those in circuit examples 1 and 2. In this manner, circuit example 1 and circuit example 2 may be combined as appropriate.

[Control Structure of Power Supply Device 50]

Figure 9:
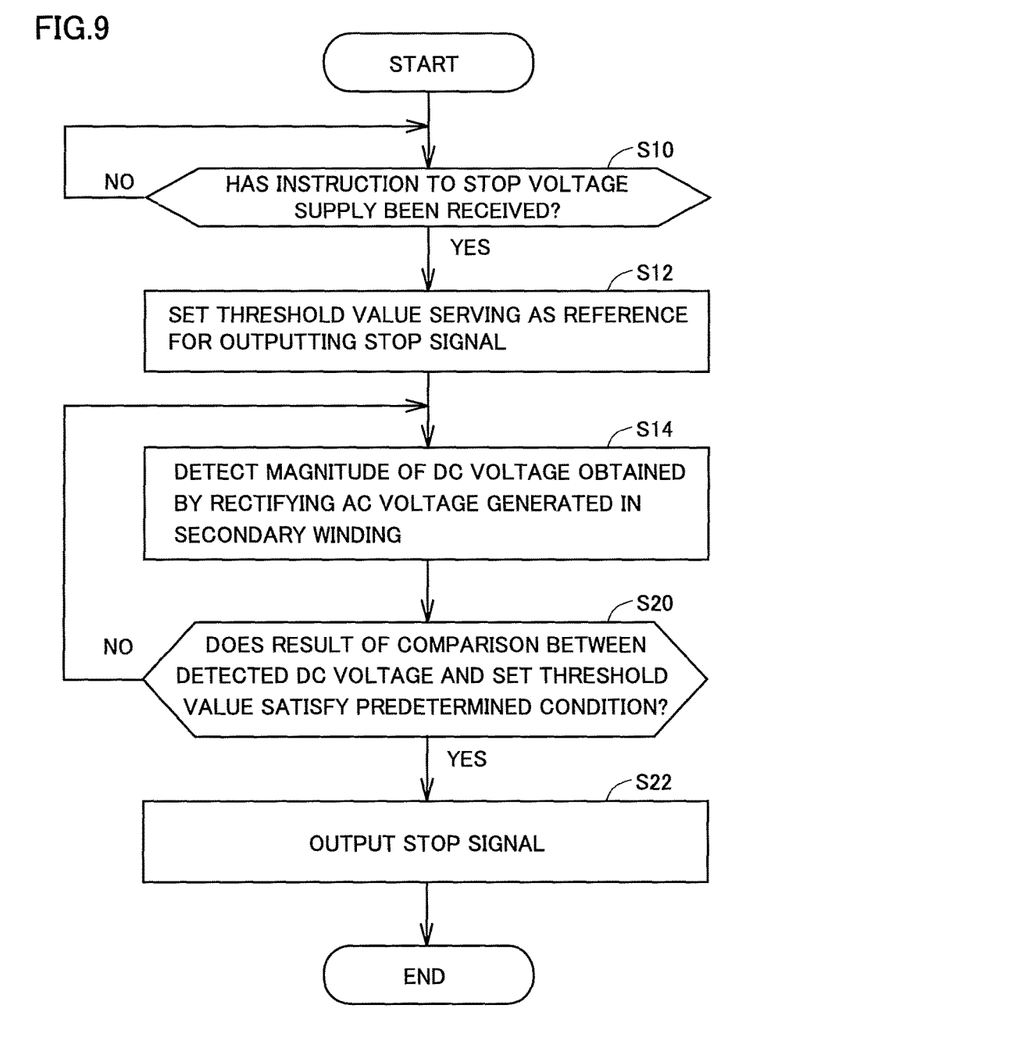
FIG. 9 is a flowchart showing a portion of processing performed by the power supply device in accordance with the embodiment.

Referring to FIG. 9, a control structure of power supply device 50 will be described. FIG. 9 is a flowchart showing a portion of processing performed by power supply device 50. The processing of FIG. 9 is implemented when each circuit within power supply device 50 executes a program. In another aspect, the processing may be partially or entirely performed by a control device such as a CPU (Central Processing Unit), or other hardware.

In step S10, power supply device 50 determines whether or not it has received an instruction to stop voltage supply from image forming apparatus 100. As an example, the instruction to stop voltage supply is issued on the basis that a user has performed an operation to stop a power supply on image forming apparatus 100. When power supply device 50 determines that it has received an instruction to stop voltage supply from image forming apparatus 100 (YES in step S10), power supply device 50 switches control to step S12. Otherwise (NO in step S10), power supply device 50 performs the processing in step S10 again.

In step S12, threshold value setting circuit 68 (see FIG. 2) of power supply device 50 sets threshold value $V_{th}$ (see FIG. 3) serving as the reference for outputting a stop signal, according to the magnitude of the load connected to power supply device 50.

In step S14, voltage detection circuit 67 (see FIG. 2) of power supply device 50 rectifies the AC voltage generated in secondary winding WA2 (see FIG. 2), and detects the magnitude of DC voltage $V_{in}$ (see FIG. 2) obtained by rectifying the AC voltage.

In step S20, output circuit 69 (see FIG. 2) of power supply device 50 determines whether or not the result of comparison between DC voltage $V_{in}$ detected in step S14 and threshold value $V_{th}$ set in step S12 satisfies a predetermined condition. As an example, the predetermined condition is satisfied when DC voltage $V_{in}$ exceeds threshold value $V_{th}$. When power supply device 50 determines that the result of comparison between DC voltage $V_{in}$ and threshold value $V_{th}$ satisfies the predetermined condition (YES in step S20), power supply device 50 switches control to step S22. Otherwise (NO in step S20), power supply device 50 returns control to step S14.

In step S22, output circuit 69 of power supply device 50 outputs a stop signal indicating stop of power supply by power supply device 50. The stop signal may be output to an external apparatus such as image forming apparatus 100, or to an internal device of power supply device 50.

[Control Structure of Image Forming Apparatus 100]

Figure 10:
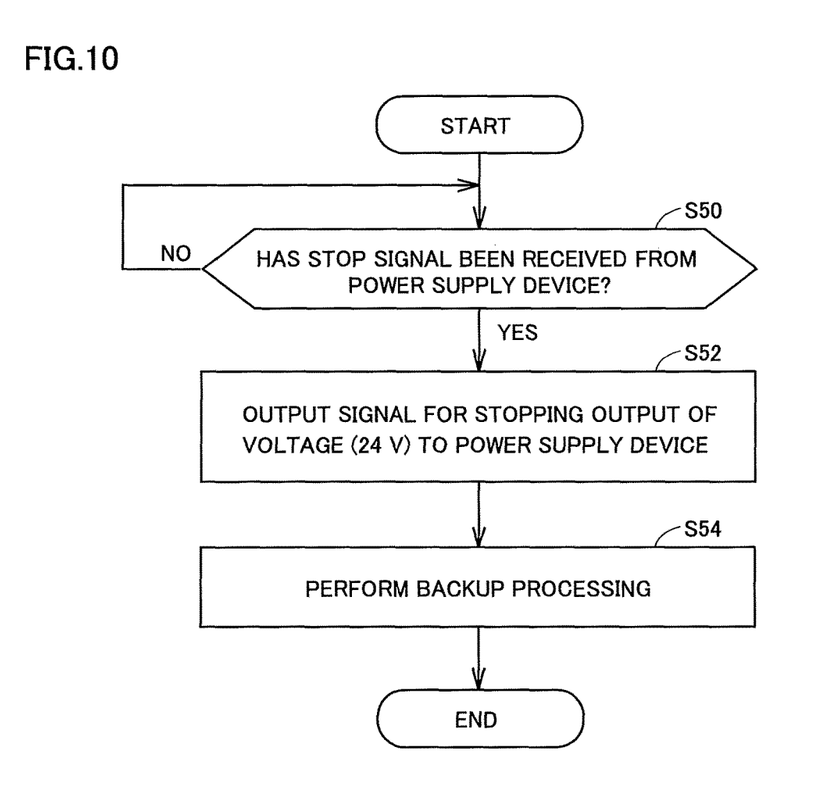
FIG. 10 is a flowchart showing a portion of processing performed by the image forming apparatus in accordance with the embodiment.

Referring to FIG. 10, a control structure of image forming apparatus 100 will be described. FIG. 10 is a flowchart showing a portion of processing performed by image forming apparatus 100. The processing of FIG. 10 is implemented when main body control device 51 (see FIG. 1) of image forming apparatus 100 executes a program. In another aspect, the processing may be partially or entirely performed by a circuit element or other hardware.

In step S50, main body control device 51 determines whether or not it has received a stop signal from power supply device 50. When main body control device 51 determines that it has received a stop signal from power supply device 50 (YES in step S50), main body control device 51 switches control to step S52. Otherwise (NO in step S50), main body control device 51 performs the processing in step S50 again.

In step S52, main body control device 51 outputs a signal for stopping output of a voltage of 24 V, to control circuit 64B (see FIG. 4) of power supply device 50. Thereby, output of a voltage of 24 V is stopped, in addition to output of a voltage of 5 V.

In step S54, main body control device 51 performs backup processing. As back processing, main body control device 51 stores a current set value (for example, a count value such as the number of sheets to be printed) of image forming apparatus 100 in a memory 51A (see FIG. 11) of main body control device 51.

[Hardware Configuration of Image Forming Apparatus 100]

Figure 11:
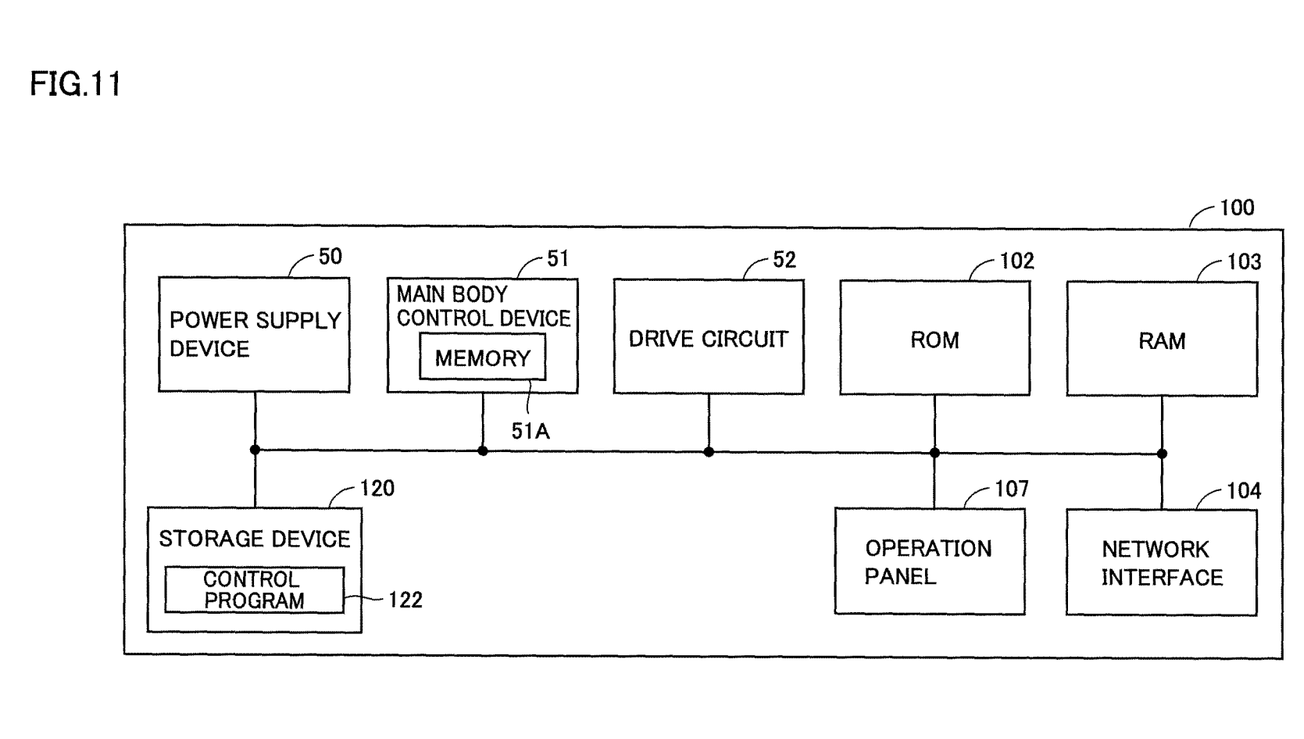
FIG. 11 is a block diagram showing a main hardware configuration of the image forming apparatus in accordance with the embodiment.

Referring to FIG. 11, an example of a hardware configuration of image forming apparatus 100 will be described. FIG. 11 is a block diagram showing a main hardware configuration of image forming apparatus 100.

As shown in FIG. 11, image forming apparatus 100 includes power supply device 50 described above, main body control device 51, a ROM (Read Only Memory) 102, a RAM (Random Access Memory) 103, a network interface 104, an operation panel 107, and a storage device 120.

Main body control device 51 is constituted of at least one integrated circuit, for example. The integrated circuit is constituted of at least one CPU, at least one DSP, at least one ASIC (Application Specific Integrated Circuit), at least one FPGA (Field Programmable Gate Array), a combination thereof, or the like, for example.

Main body control device 51 controls an operation of image forming apparatus 100 by executing a control program 122 for image forming apparatus 100. Upon receiving an instruction to execute control program 122, main body control device 51 reads control program 122 from storage device 120 into ROM 102. RAM 103 serves as a working memory, and temporarily stores various types of data required to execute control program 122.

An antenna (not shown) and the like are connected to network interface 104. Image forming apparatus 100 exchanges data with an external communication device via the antenna. The external communication device includes a mobile communication terminal such as a smartphone, a server, or the like, for example. Image forming apparatus 100 may be configured to be able to download control program 122 from a server via the antenna.

Operation panel 107 includes a display and a touch panel. The display and the touch panel are overlaid with each other, and operation panel 107 receives, for example, a print operation, a scan operation, and the like on image forming apparatus 100.

Storage device 120 is a storage medium such as a hard disk or an external storage device, for example. Storage device 120 stores control program 122 for image forming apparatus 100 and the like. The storage place of control program 122 is not limited to storage device 120, and control program 122 may be stored in a storage area of power supply device 50, memory 51A of main body control device 51, ROM 102, RAM 103, an external device (for example, a server), or the like.

Control program 122 may be provided with being incorporated into a portion of an arbitrary program, instead of being provided as a single program. In this case, control processing in accordance with the present embodiment is implemented in cooperation with the arbitrary program. Even a program not including some modules as described above does not depart from the gist of control program 122 in accordance with the present embodiment. Further, some or all of the functions provided by control program 122 may be implemented by dedicated hardware. Furthermore, image forming apparatus 100 may be configured in the form of a so-called cloud service in which at least one server performs a portion of processing of control program 122.

CONCLUSION

As has been described above, power supply device 50 sets a threshold value serving as a reference for outputting a stop signal, according to the magnitude of a load connected thereto. As a result, power supply device 50 can delay timing to output the stop signal as the connected load has a lower load. Thereby, the time taken from when the stop signal is output to when voltage supply stops becomes constant irrespective of the magnitude of the load.

Although embodiments of the present invention have been described and illustrated in detail, it is clearly understood that the same is by way of illustration and example only and not limitation, the scope of the present invention should be interpreted by terms of the appended claims.

What is claimed is:

1. A power supply device, comprising:
    a first transformer including a primary winding and a secondary winding;
    a first control circuit for controlling a switching operation of a switch element electrically connected with the primary winding, and cause the primary winding to generate a first AC (Alternating Current) voltage;
    an application circuit for receiving a second AC voltage generated in the secondary winding by mutual induction with the primary winding to which the first AC voltage is applied, and apply an output voltage according to the second AC voltage to a load connected to the power supply device;
    a voltage detection circuit for detecting a magnitude of a DC (Direct Current) voltage obtained by rectifying the first AC voltage or the second AC voltage; and
    an output circuit for outputting a stop signal indicating stop of the power supply device, when a result of comparison between the magnitude of the DC voltage and a threshold value set according to a magnitude of the load satisfies a predetermined condition, after reception of an instruction to stop voltage supply.

2. The power supply device according to claim 1, wherein the output circuit outputs the stop signal when the DC voltage obtained by rectifying the second AC voltage is more than the threshold value.

3. The power supply device according to claim 1, wherein the output circuit outputs the stop signal when the DC voltage obtained by rectifying the first AC voltage is less than the threshold value.

4. The power supply device according to claim 3, wherein the power supply device further comprises a setting circuit for setting the threshold value, and
    the setting circuit detects a current flowing into the load, and increases the threshold value with an increase in the current.

5. The power supply device according to claim 4, wherein the second AC voltage is a PWM (Pulse Width Modulation) signal, and
    the setting circuit detects a magnitude of the current flowing into the load, based on a duty ratio of the PWM signal.

6. The power supply device according to claim 3, wherein the power supply device has a first output mode, and a second output mode in which a voltage to be output to the load is less than that in the first output mode, and
    the threshold value in the second output mode is lower than the threshold value in the first output mode.

7. The power supply device according to claim 1, wherein the threshold value is set from among a plurality of predetermined different threshold values, according to the magnitude of the load.

8. The power supply device according to claim 1, wherein the output circuit outputs the stop signal after a predetermined time elapses after reception of an instruction to start voltage supply.

9. The power supply device according to claim 1, wherein the power supply device further comprises
a second transformer, and
a second control circuit for controlling a voltage to be applied to the second transformer, and
the second control circuit stops application of the voltage to the second transformer based on reception of the stop signal from the output circuit.

10. The power supply device according to claim 9, wherein the first transformer outputs a voltage having a magnitude different from that of the second transformer.

11. The power supply device according to claim 1, wherein the output circuit outputs the stop signal to an external apparatus and thereby cause the external apparatus to perform backup processing.

12. The power supply device according to claim 1, wherein the threshold value is set based on a connection status of the load to an external apparatus.

13. The power supply device according to claim 1, wherein the first control circuit controls the first transformer using a flyback scheme.

14. An image forming apparatus comprising the power supply device according to claim 1.

15. A method for controlling a power supply device having a transformer, comprising:
controlling a switching operation of a switch element electrically connected with a primary winding of the transformer, and causing the primary winding to generate a first AC voltage;
receiving a second AC voltage generated in a secondary winding of the transformer by mutual induction with the primary winding to which the first AC voltage is applied, and applying an output voltage according to the second AC voltage to a load connected to the power supply device;
detecting a magnitude of a DC voltage obtained by rectifying the first AC voltage or the second AC voltage; and
outputting a stop signal indicating stop of the power supply device, when a result of comparison between the magnitude of the DC voltage and a threshold value set according to a magnitude of the load satisfies a predetermined condition, after reception of an instruction to stop voltage supply.

16. The method according to claim 15, wherein outputting a stop signal includes outputting the stop signal when the DC voltage obtained by rectifying the second AC voltage is more than the threshold value.

17. The method according to claim 15, wherein outputting a stop signal includes outputting the stop signal when the DC voltage obtained by rectifying the first AC voltage is less than the threshold value.

18. The method according to claim 15, wherein the threshold value is set from among a plurality of predetermined different threshold values, according to the magnitude of the load.

19. The method according to claim 15, wherein output a stop signal includes outputting the stop signal after a predetermined time elapses after reception of an instruction to start voltage supply.

20. The method according to claim 15, further comprising:
applying the voltage to a second transformer included in the power supply device; and
stopping, based on that the stop signal is output, application of the voltage to the second transformer.

* * * * *